United States Patent [19]

Commaret et al.

[11] Patent Number: 4,901,522

[45] Date of Patent: Feb. 20, 1990

[54] TURBOJET ENGINE COMBUSTION CHAMBER WITH A DOUBLE WALL CONVERGING ZONE

[75] Inventors: Patrice Commaret, Le Mee s/Seine; Michel A. A. Desaulty, Vert St Denis; Didier H. Hernandez, Ormoy; Jean-Claude Laugeois, Palaiseau; Gérard M. F. Mandet, Fericy; Rodolphe Martinez, Perigny s/Yerres, all of France

[73] Assignee: Societe Nationale d'Etude et de Construction de Moteurs d'Aviation (SNECMA), Paris, France

[21] Appl. No.: 281,749

[22] Filed: Dec. 9, 1988

[30] Foreign Application Priority Data

Dec. 16, 1987 [FR] France .................................. 87 17546

[51] Int. Cl.[4] ............................................. F23R 3/60
[52] U.S. Cl. .................................... 60/39.32; 60/752; 60/760
[58] Field of Search .................. 60/752, 39.83, 757, 60/754, 39.31, 39.32, 760

[56] References Cited

U.S. PATENT DOCUMENTS

| | | | |
|---|---|---|---|
| 2,813,297 | 11/1957 | Fisher et al. | 60/39.32 |
| 3,899,876 | 8/1975 | Williamson | 60/39.66 |
| 4,232,527 | 11/1980 | Reider | 60/754 |
| 4,480,436 | 11/1984 | Maclin | 60/752 |
| 4,555,901 | 12/1985 | Wakeman et al. | 60/39.32 |
| 4,567,730 | 2/1986 | Scott | 60/752 |
| 4,628,694 | 12/1986 | Kelm et al. | 60/752 |
| 4,688,310 | 8/1987 | Kelm et al. | 29/156.8 R |
| 4,719,748 | 1/1988 | Davis, Jr. et al. | 60/760 |
| 4,805,397 | 2/1989 | Barbier et al. | 60/39.32 |

FOREIGN PATENT DOCUMENTS

| | | | |
|---|---|---|---|
| 0248731 | 12/1987 | European Pat. Off. | |
| 1957147 | 11/1968 | Fed. Rep. of Germany | |
| 2567250 | 1/1986 | France | |
| 2579724 | 10/1986 | France | |
| 2172987 | 10/1986 | United Kingdom | |
| 2200738 | 8/1988 | United Kingdom | 60/757 |

Primary Examiner—Louis J. Casaregola
Assistant Examiner—Timothy S. Thorpe
Attorney, Agent, or Firm—Bacon & Thomas

[57] ABSTRACT

The combustion chamber according to the present invention utilizes a double-walled structure only in the converging portion of the combustion chamber. A hot wall is retained adjacent to, but spaced from a corresponding cold wall so as to provide a cooling space between them. An upstream portion of the hot wall is retained in a notch defined by the cold wall, while the downstream portions each have generally radially extending flanges. Studs pass through openings in the adjacent flanges to prevent any relative circumferential movement, while a clamp serves to attach the flanges to the inlet of a turbine. The clamp slidably retains the flanges therein so as to permit relative radial movement to accommodate any thermal expansion and contraction of the combustion chamber, solely by the appended claims.

8 Claims, 2 Drawing Sheets

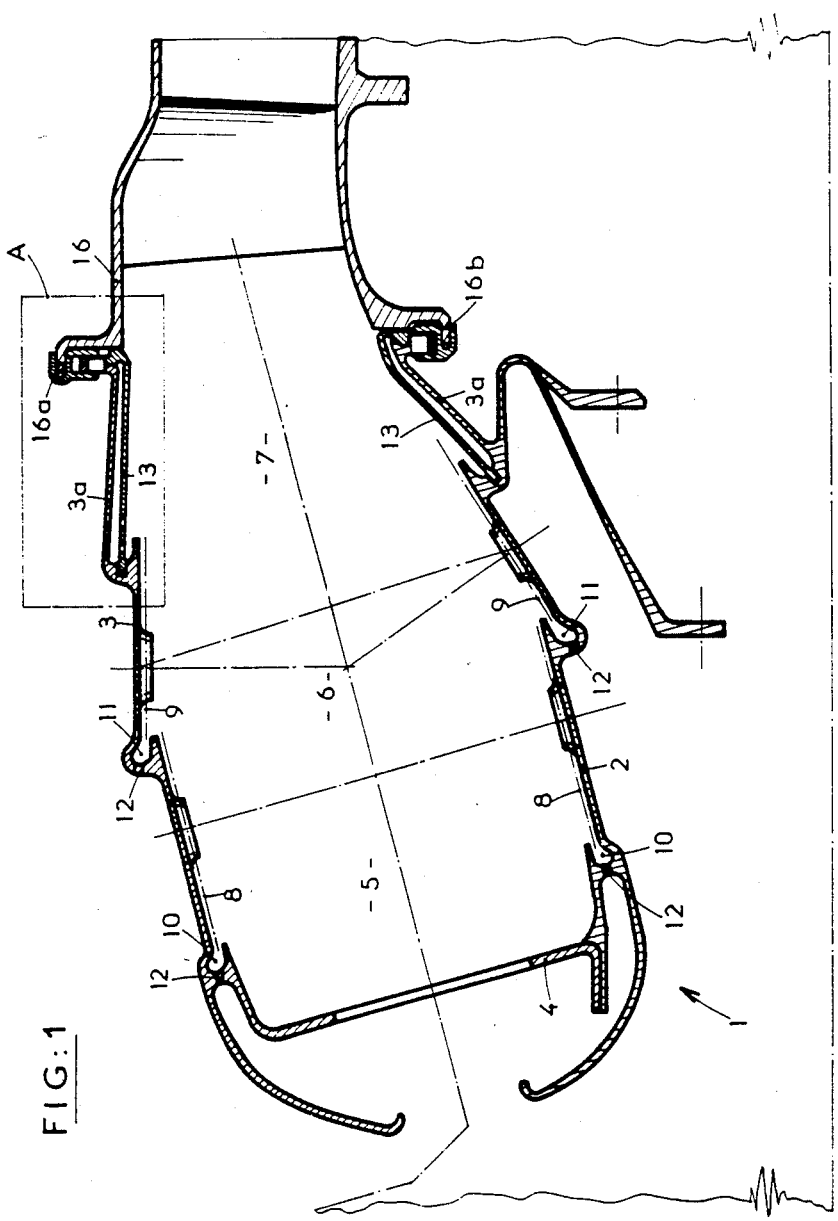

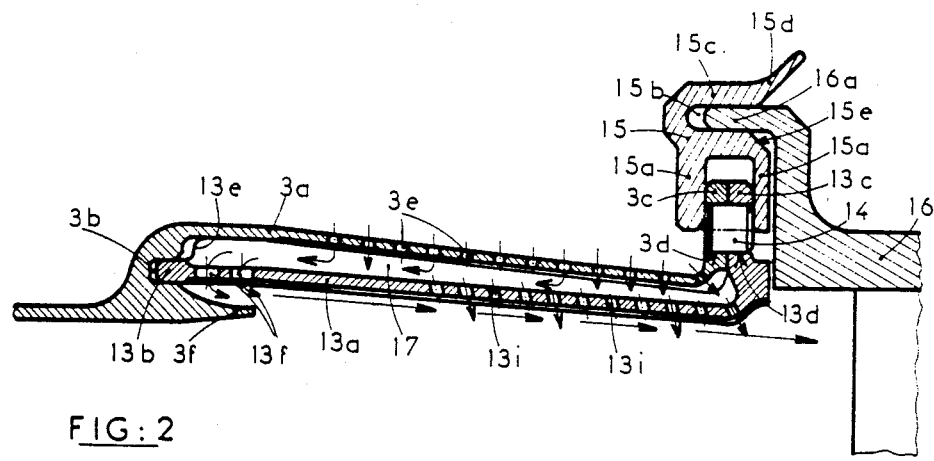
FIG: 2
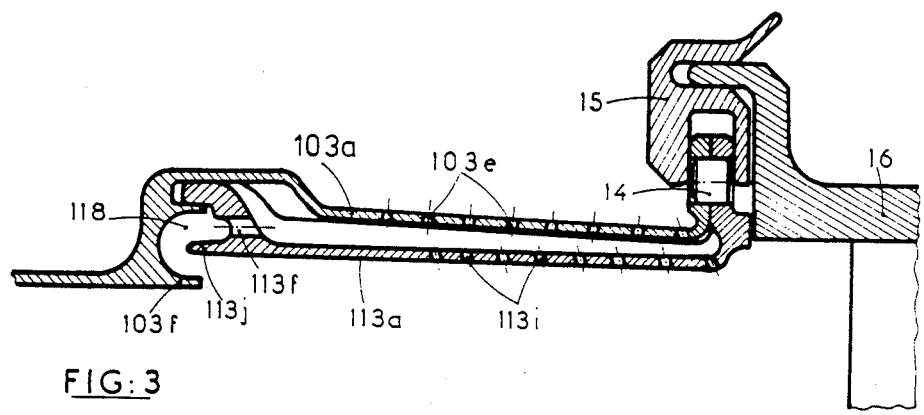
FIG: 3
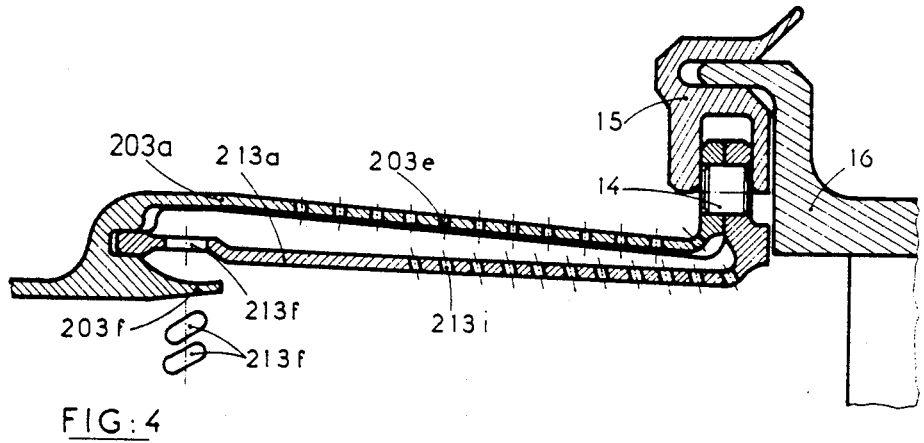
FIG: 4

TURBOJET ENGINE COMBUSTION CHAMBER WITH A DOUBLE WALL CONVERGING ZONE

BACKGROUND OF THE INVENTION

The present invention relates to combustion chambers for aircraft type turbojet engines, specifically such combustion chambers having a generally annular configuration with a double walled converging zone.

It is well known that the power output of an aircraft type turbojet engine is directly related to the temperature of the combustion gases at the inlet of the turbine section of the engine. In order to increase the power, today's jet engines have such operating temperatures on the order of 1,800° K. However, the specific fuel consumption of the jet engines is very high at these operating temperatures. In order to maintain acceptable fuel consumption, present day engines have been designed with increasing compression ratios.

While the increased operating temperatures and the increased compression ratios have provided jet engines with improved performance and specific fuel consumption figures, the structure of the combustion chambers has had to be modified to obtain the necessary strength and the requisite service life. The combustion chambers are typically designed to incorporate double thickness walls on both the inner and outer annular boundary walls so as to provide the necessary cooling to the inner walls, which are exposed to the combustion gases. Failure to provide such cooling will typically reduce the service life of the combustion chamber or result in structurally weakened areas. The provision of the double walls throughout the length of the combustion chamber has increased both the complexity and the inherent costs of such turbojet engines.

French patent Nos. 2,567,250 and 2,579,724 illustrate the known type of double-walled combustion chamber wherein the hot wall portions are retained in the adjacent cold wall portions by the interengagement of a lip formed on the hot walls with a groove formed in the cold walls.

Typical of the prior devices, these patents also show the attachment of the downstream end of the hot and cold wall to the turbine inlet area by means of one or more bolts passing through corresponding flanges. This rigid attachment does not provide for any relative radial expansion between the combustion chamber and the turbine inlet.

SUMMARY OF THE INVENTION

The present invention relates to a turbojet engine combustion chamber that defines a primary combustion zone (wherein the air-fuel mixture is ignited and burned), a dilution zone (in which outside cooling air is mixed with the hot combustion gases) and a downstream zone of converging shape connected to the inlet of the turbine to increase the speed of the gases passing from the combustion chamber into the turbine, while at the same time homogenizing the exit temperature of the combustion gases. The combustion chamber according to the invention incorporates a double thickness wall only in the converging zone.

The combustion chamber according to the present invention utilizes a double-walled structure only in the converging portion of the combustion chamber. The hot wall is retained adjacent to, but spaced from the corresponding cold wall so as to provide a cooling space therebetween. An upstream portion of the hot wall is retained in a notch defined by the cold wall, while the downstream portions each define generally radially extending flanges. Studs pass through openings in the adjacent flanges to prevent any relative circumferential movement while a clamp serves to attach the flanges to the inlet of the turbine. The clamp slidably retains the flanges therein so as to permit relative radial movement therebetween to accommodate any thermal expansion and contraction of the combustion chamber.

BRIEF DESCRIPTION OF THE DRAWINGS

FIG. 1 is a partial, longitudinal cross sectional view of an annular combustion chamber according to the invention.

FIG. 2 is an enlarged cross-sectional view of the area indicated at A in FIG. 1.

FIG. 3 is an enlarged, cross-sectional view of a second embodiment of the wall structure shown in FIG. 2.

FIG. 4 is an enlarged, cross-sectional view of a third embodiment of the wall structure shown in FIG. 2.

DETAILED DESCRIPTION OF THE PREFERRED EMBODIMENTS

As seen in FIG. 1, the combustion chamber 1 according to the present invention comprises a radially inner wall 2 defining the inner boundary of the combustion zone and the dilution zone, and a radially outer wall 3 defining the outer boundary of the combustion zone and the dilution zone. The inner and outer walls 2 and 3 are interconnected adjacent their upstream end portions by a base 4 in which the fuel injector mechanism and air inlets (not shown) are mounted in known fashion. The single thickness walls 2 and 3 define a primary combustion zone 5 in which the air-fuel mixture is ignited and burned, and a dilution zone 6 located downstream of the combustion zone 5 in which additional air is mixed with the combustion gases by passing through orifices formed in the inner and outer walls in known fashion. The interior surfaces of the inner and outer walls 2 (i.e. those surfaces facing inwardly toward the combustion zone and dilution zone) are cooled by the presence of cooling air films, illustrated schematically at 8 and 9 in FIG. 1. The cooling air films 8 and 9 are generated from air supplied to annular chambers 10 and 11 which, in turn, are supplied by air through supply orifices 12 in known fashion.

The combustion chamber 1 also includes a converging zone 7 that is defined by double thickness inner and outer walls. Each of the inner and outer walls comprises a cold wall 3a and a hot wall 13. The converging zone 7 converges in a downstream direction and is connected to the inlet of turbine section 16. Since the converging zone 7 subjects the encompassing walls high stresses generated by the pressure and the speed of the hot gases passing through this zone, both the inner and outer walls are made of double thickness.

In the embodiment of the double thickness wall structure shown in FIGS. 1 and 2, the cold wall 3a defines a generally axially facing notch 3b and a generally radially extending flange 3c extending from its downstream end portion. The flange 3c defines a plurality of bores 3d circumferentially displaced around the flange. A downstream portion of the cold wall 3a also defines a plurality of cooling perforations 3e.

Each of the double thickness walls also comprises a hot wall 13 having a wall section 13a with an upstream portion 13b adapted to enter the notch 3b of the cold wall so as to support the upstream end of the hot wall therein.

A generally radially extending flange 13c extends from the downstream end of the hot wall 13 so as to lie adjacent to the corresponding flange 3c. The flange 13c also defines of plurality of bores 13d which are circumferentially aligned with the bores 3d. Relative circumferential movement between the hot wall and the cold wall is prevented by the insertion of generally cylindrical studs 14 into the bores 3d and 13d, respectively.

The hot wall 13a is radially displaced from the cold wall 3a so as to define a cooling space 17 therebetween. The upstream portion of hot wall 13a also defines a plurality of evacuation orifices 13f in order to evacuate the cooling air from the space 17. Such cooling air is supplied through the cooling perforations 3e and, as indicated by the arrows in FIG. 2, passes along the wall 13a in a direction contrary to the flow of the hot gases through the combustion chambers. The counter flow air is evacuated from the chamber 17 through evacuation orifices 13f.

A lip 3f formed on the upstream portion of the cold wall 3 lies adjacent to the evacuation orifices 13f and directs the cooling air passing therethrough along the interior surface of the hot wall 13a to provide a cooling film thereon. This serves to prevent heat damage to the wall caused by the hot combustion gases. This cooling film may be supplemented by air passing through cooling perforations 13i formed in the downstream portion of the hot wall 13a. The cooling perforations 13i are positioned so as to be out of alignment with the cooling perforations 3e.

The hot wall 13 may be formed from a plurality of arcuate segments 13a retained in position with respect to the cold wall by the interengagement of the upstream portion 13b in notch 3b and the cylindrical studs 14 engaging corresponding bores 3d and 13d. The downstream portions of the hot and cold walls are attached to the turbine section 16 via clamp 15. Clamp 15 has generally radially extending arms 15a defining a generally radially opening groove dimensioned so as to slidably receive the flanges 3c and 13c as illustrated in FIG. 2. The notch is dimensioned so as to prevent any substantial axial movement between the flanges and the clamp. The radial dimension of the notch, however, is greater than that of the flanges 3c and 13c so as to permit relative radial movement therebetween caused by radial expansion or contraction of the walls due to the presence or absence of hot gases in the combustion chamber.

Clamp 15 also has leg 15c defining a generally axially extending groove 15b dimensioned so as to slidably accept axially extending flange 16a or 16b (see FIG. 1) formed on the inlet of the turbine 16. The downstream end of leg 15c may be flared outwardly as at 15d to provide, along with the beveled surface 15e, a guide to the entrance of the flange 16a or 16b into the notch 15b.

The structure of the double wall provides several means for cooling the hot wall and thereby preserving its useful life. The air passing through the perforations 3e serves to cool the wall by impact onto the wall 13a. Air passing into the space 17 between the hot and cold walls is guided in an upstream direction along one surface of the hot wall 17 by longitudinal guide strips 13e affixed to the surface of the hot wall 13 facing the cold wall 3. The longitudinal guide strips 13e extend in a generally longitudinal direction and cover substantially the entire height of the space 17 between the hot and cold walls.

After passing along the surface of hot wall 13 the air passes through the evacuation openings 13f and, due to the presence of lip 3f, is guided along the interior surface of the wall 13a. This serves as a peripheral cooling film to convection cool the hot wall 13. This cooling film is supplemented by air passing through the cooling perforations 13i formed on the downstream half of the hot wall 13. The cooling perforations 13i are staggered and offset from the cooling perforations 3e to prevent the air passing directly through the space 17.

A second embodiment of the double thickness wall structure is illustrated in FIG. 3. In this embodiment, the function of the generally radial flanges formed on the hot and cold walls, the clamping device and the cooling perforations all function as in the previously described embodiment. The only difference between this embodiment and that previously described resides in the attachment of the upstream end portion of the hot wall to that of the cold wall. In this embodiment, each of the hot wall segments 113a defines an upstream facing lip 113j and the lip by which the hot wall 113a is attached to the cold wall 103a is displaced from the plane of the hot wall 113a. The cold wall 103a is shaped so as to define, with the lip 113j, a direction reversing chamber 118. Thus, the air passing into the chamber between the hot and cold walls through the cooling perforations 103e again passes in an upstream direction (toward the left as viewed in FIG. 3) through the evacuation orifices 113f and into the chamber 118. The lip 103f serves to direct this air emanating from chamber 118 along the surface of the hot wall 113a to form a cooling film. Again, this film may be supplemented by air passing through the cooling perforations 113i formed in the downstream half of the hot wall 113a.

A third embodiment of the double walled structure according to the invention is illustrated in FIG. 4 and differs from that shown in FIG. 2 only in the shape of the evacuation orifices indicated at 213f in FIG. 4. In this embodiment, the evacuation orifices 213f are elongated and slanted relative to the longitudinal axis of the combustion chamber in order to achieve a better distribution of the cooling air over the lip 203f and to avoid any disturbances in the cooling film formed on the hot wall 213a.

Although only the double thickness structure of the outer wall has been described in detail, it is to be understood that the double thickness portion of the inner wall is similarly configured.

The structure according to the invention provides the converging nozzle portion of the combustion chamber with improved cooling of the walls, while at the same time simplifying the construction and the attachment to the turbine nozzle thereby decreasing the assembly time and maintenance costs.

The foregoing description is provided for illustrative purposes only and should not be construed as in any way limiting this invention, the scope of which is defined solely by the appended claims.

What is claimed is:

1. In a turbojet engine having a turbine section, the improved annular combustion chamber having a combustion zone, a dilution zone and convergent zone comprising:

(a) a single thickness first outer annular wall defining a radially outer boundary of the combustion zone and the dilution zone;

(b) a single thickness first inner annular wall defining a radially inner boundary of the combustion zone and the dilution zone;

(c) a double thickness, second outer annular wall defining a radially outer boundary of the convergent zone and connected to the single thickness outer annular wall comprising:

(i) a first cold wall having a first flange extending radially from a downstream edge; and, (ii) a first hot wall disposed adjacent to but spaced radially inwardly of the first cold wall, and having a second flange extending radially from a downstream edge;

(d) first attaching means to attach the first and second flanges to the turbine section so as to allow relative radial movement between the flanges and the turbine section;

(e) a double thickness second inner annular wall defining a radially inner boundary of the convergent zone and connected to the single thickness inner annular wall comprising:

(i) a second cold wall having a third flange extending radially from a downstream edge; and, (ii) a second hot wall disposed adjacent to but spaced radially outwardly of the second cold wall, and having a fourth flange extending radially from a downstream edge;

(f) second attaching means to attach the third and fourth flanges to the turbine section so as to allow relative radial movement between the flanges and the turbine section;

(g) a plurality of bores defined by the first, second, third and fourth flanges; and, (h) a plurality of generally cylindrical studs extending into the bores between the first and second flanges, and between the third and fourth flanges so as to prevent relative circumferential movement between the first and second flanges, and the third and fourth flanges, respectively.

2. The improved combustion chamber according to claim 1 wherein the first attaching means comprises:

(a) a fifth flange extending generally axially from the turbine section; and (b) a first clamp defining a first, radially opening groove dimensioned so as to slidably receive at least a portion of the first and second flanges so as to prevent any substantial axial movement therebetween, and defining a second, axially opening groove dimensioned so as to receive the fifth flange.

3. The improved combustion chamber according to claim 2 wherein the second attaching means comprises:

(a) a sixth flange extending generally axially from the turbine section; and (b) a second clamp defining a third, radially opening groove dimensioned so as to slidably receive at least a portion of the third and fourth flanges so as to prevent any substantial axial movement therebetween, and defining a fourth, axially opening groove dimensioned so as to receive the sixth flange.

4. The improved combustion chamber according to claim 3 wherein the radial dimensions of the first and third radially opening grooves are greater than radial dimensions of the first, second, third and fourth flanges so as to allow radial movement of the first and second hot and cold walls with respect to the first and second clamps.

5. The improved combustion chamber according to claim 1 wherein the first and second cold walls each define a notch adjacent an upstream edge and wherein the first and second hot walls each comprise a plurality of arcuate segments, each segment having an upstream edge portion engaging the notch in the respective cold wall.

6. The improved combustion chamber according to claim 5 further comprising:

(a) a plurality of first cooling perforations defined by a downstream portion of the first and second cold walls, respectively to allow cooling air to enter the space between the respective hot and cold walls; and (b) evacuation orifices defined by upstream portions of the first and second hot walls to permit evacuation of the cooling air in the space between the hot and cold walls.

7. The improved combustion chamber according to claim 6 further comprising a generally axially extending lip formed on an upstream portion of each cold wall and extending generally axially adjacent the evacuation orifices so as to direct air passing through the orifices along a surface of the respective hot wall.

8. The improved combustion chamber according to claim 7 further comprising a plurality of second cooling perforations defined by a downstream portion of each hot wall, the second cooling perforations located so as to be out of alignment with the first cooling perforations.

* * * * *